Nov. 23, 1965   A. V. MARTIN ETAL   3,219,270
PUBLIC AND PROTECTIVE COUNTERS
Filed July 3, 1963                     6 Sheets-Sheet 5
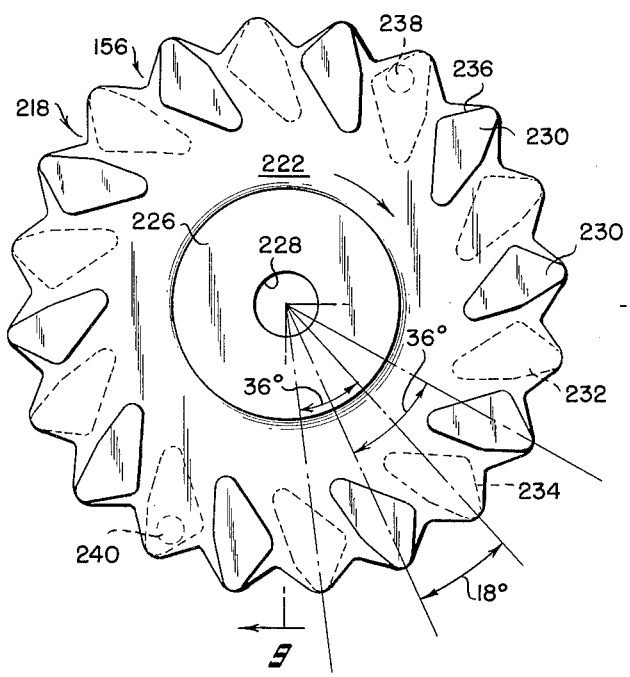
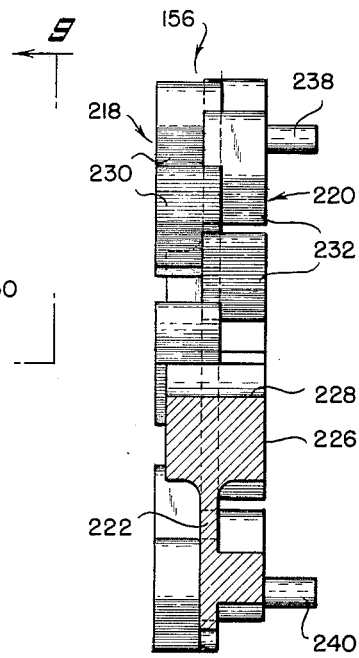
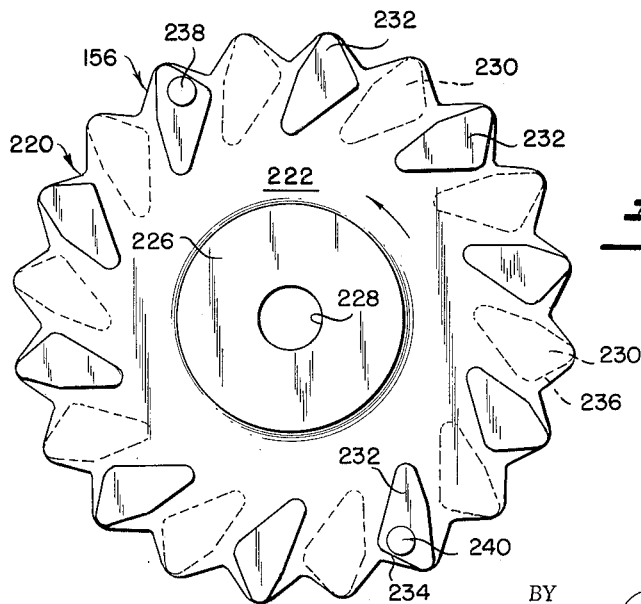
INVENTORS
*Afton V. Martin*
*Anthony T. Galbato*
BY
*Strauch, Nolan & Neale*
ATTORNEYS Nov. 23, 1965 A. V. MARTIN ETAL 3,219,270
PUBLIC AND PROTECTIVE COUNTERS
Filed July 3, 1963 6 Sheets-Sheet 6

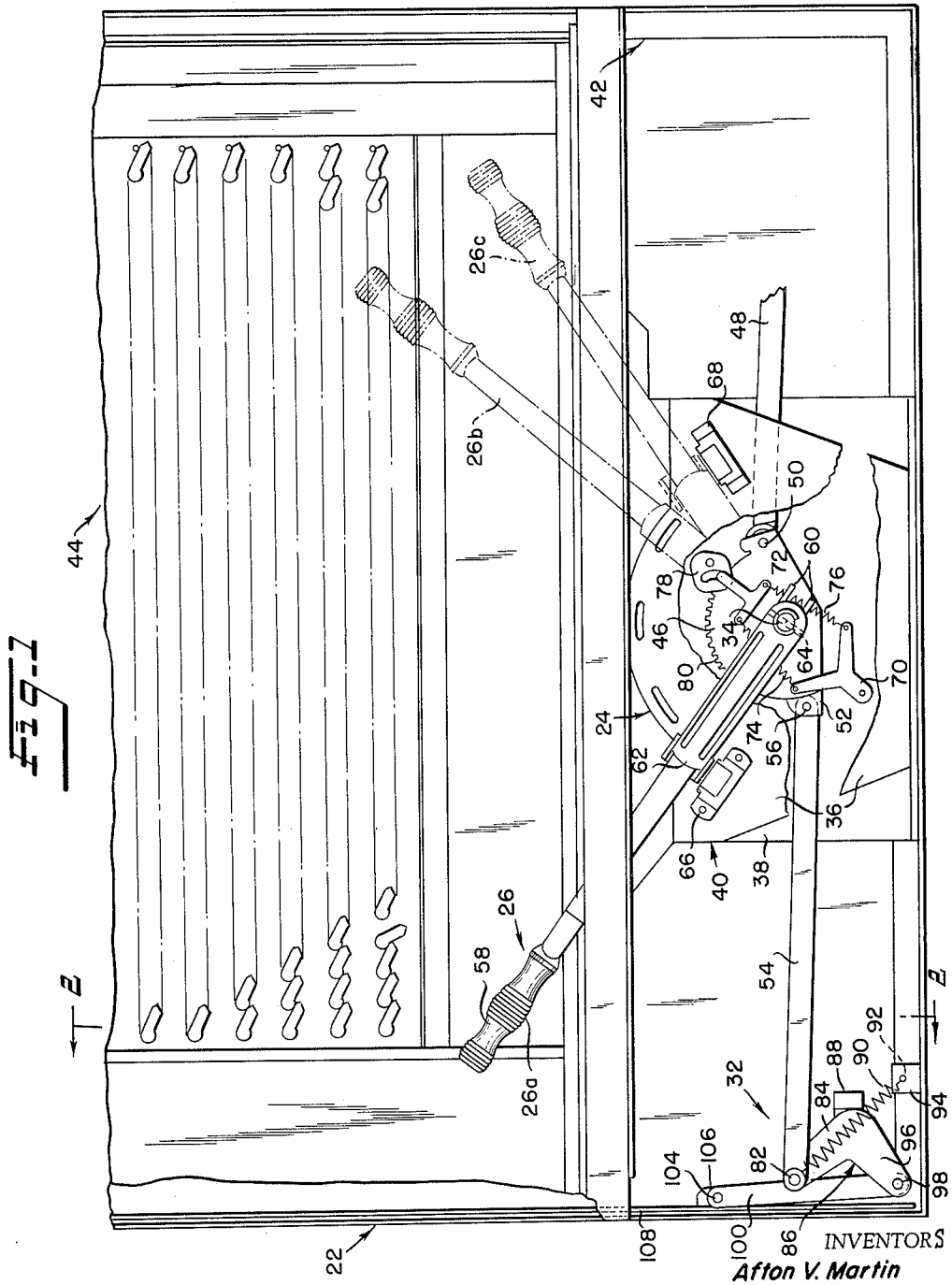

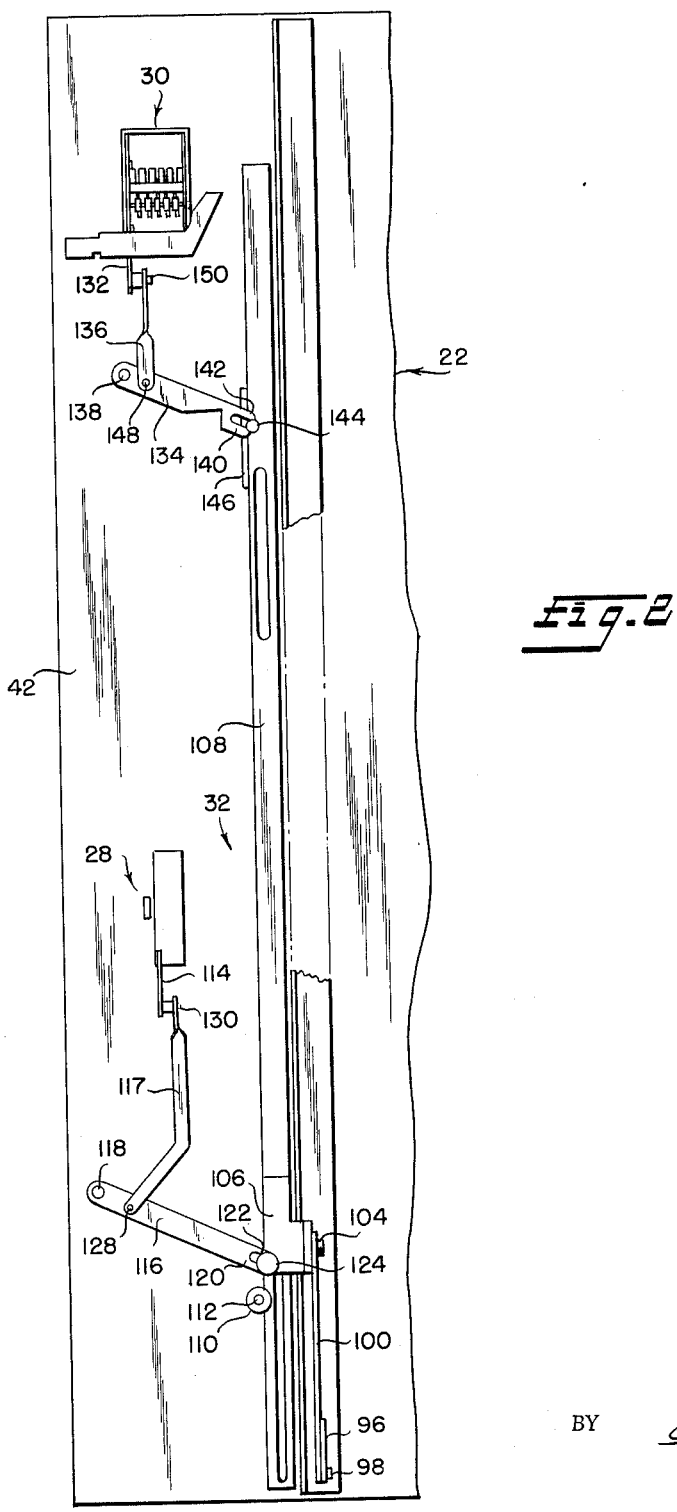

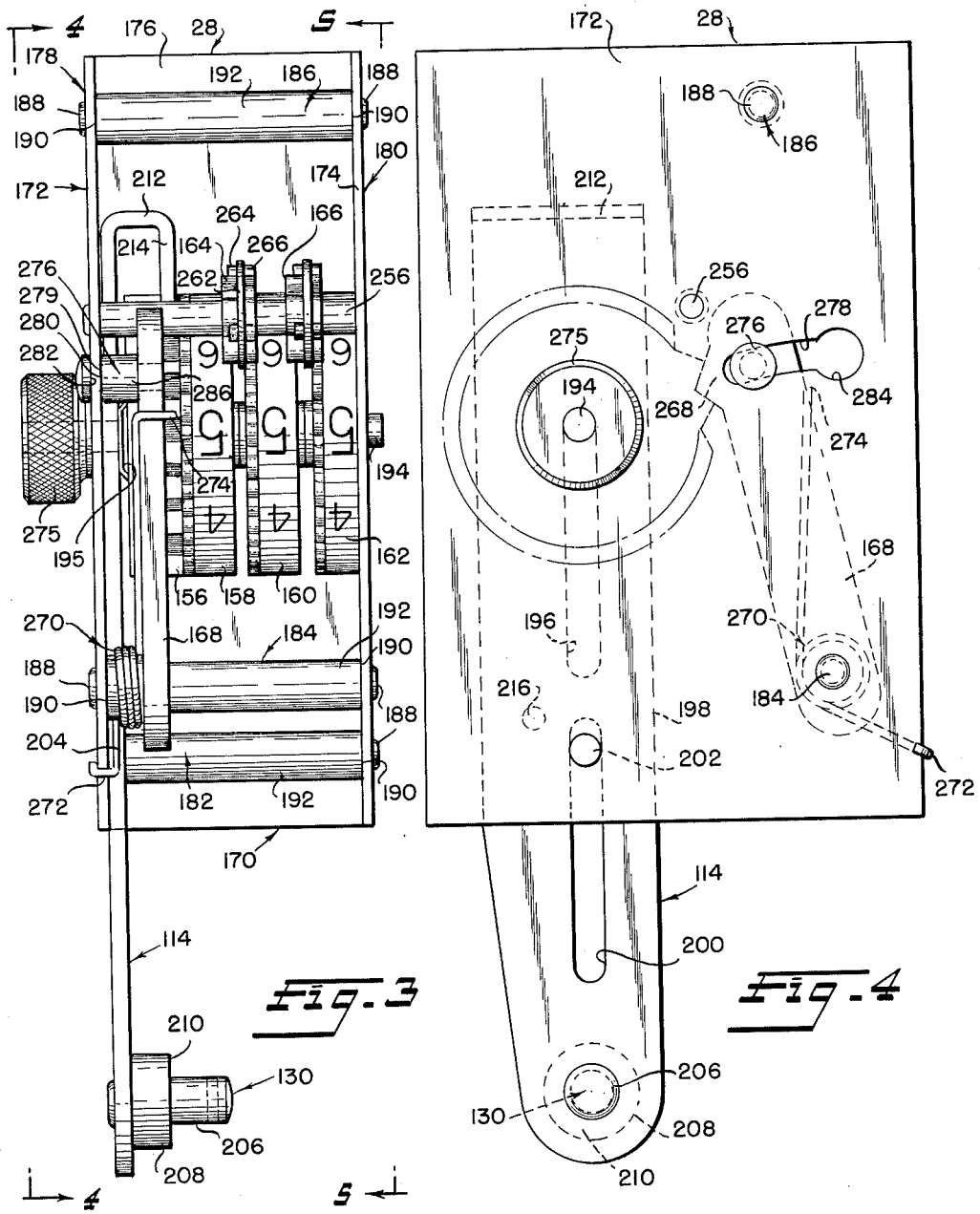

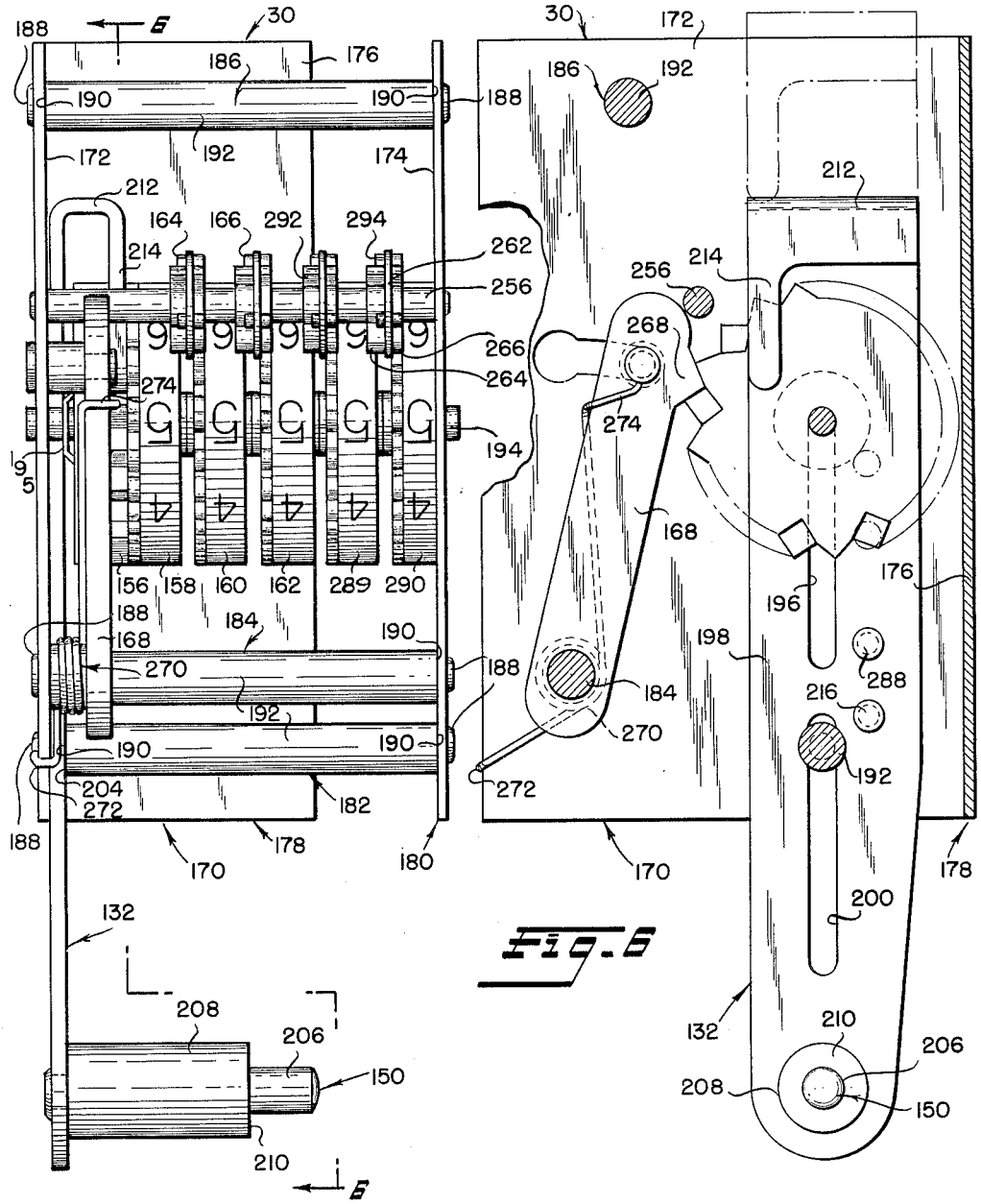

INVENTORS
Afton V. Martin
Anthony T. Galbato
BY Strauch, Nolan & Neale
ATTORNEYS

United States Patent Office 3,219,270
Patented Nov. 23, 1965

---

3,219,270
PUBLIC AND PROTECTIVE COUNTERS
Afton V. Martin and Anthony T. Talbato, Jamestown, N.Y., assignors, by mesne assignments, to Automatic Voting Machine Corporation, Jamestown, N.Y., a corporation of Delaware
Filed July 3, 1963, Ser. No. 292,669
10 Claims. (Cl. 235—91)

This invention relates to voting machines and, more specifically, to improved public and protective counters for automatic voting machines.

In voting machines of the type to which the present invention relates, a public counter and a protective counter are employed to record the number of voters using the machine during each election. The public counter is resettable and is set to zero before each election. Consequently, when the election is over the public counter will register the total number of voters who used the machine during the election.

The protective counters are permanently sealed and non-resettable and are employed to provide a check on the public counters. The protective counters are read before and after each election. If the voting machine has not been tampered with, the differences between these readings will equal the total shown by the public counter.

One type of counter heretofore employed in automatic voting machines is that shown in United States Patent No. 984,149 issued February 14, 1911, to C. H. Ocumpaugh for Voting Machine. In this type of counter the counter wheels, which are journalled on a counter wheel shaft and operatively connected by appropriate transfer pinions, are advanced by a reciprocating actuator which engages teeth formed on the units counter wheel to step the units wheel and the counter wheel shaft one-tenth of a revolution (36°) each time the actuator is reciprocated through an upstroke-downstroke cycle. A ratchet wheel fixed to the end of the counter wheel shaft opposite the units counter wheel and a spring biased pawl cooperate to positively position the counter wheels when the actuator is not engaged with the teeth formed on the counter wheel.

In this type of counter, the actuator advances the units counter wheel in two steps, one actuator carried stop engaging a tooth on the units wheel during the upstroke of the actuator and a second actuator carried stop engaging a further tooth on the units wheel during the actuator downstroke. Because of the counter construction, the manner in which the counters are assembled in the voting machine, and the nature of the mechanism employed to reciprocate the counter actuators, the actuator may be moved through as little as one-fourth of its maximum stroke when it is reciprocated. Nevertheless, the units counter wheel must be advanced through a one-tenth revolution increment by each operation of the actuator to insure that the number of voters using the machine is accurately recorded.

To accommodate variations in stroke, the prior art counters were designed so that the actuator advanced the units wheel approximately 27° on the upstroke and 9° on the downstroke. This resulted in the formation of a dead center position such that, if the units wheel were advanced to this position by the actuator upstroke, the downstroke would not advance it the remaining 9° and the counter would not register.

It is, therefore, a primary object of the present invention to provide public and protective counters of the two-step type which will invariably be advanced if their actuators are operated even though the actuator is advanced through as little as one-third to one-fourth of its stroke.

In general, the novel counters provided by the present invention for achieving this end include a plurality of rotatably mounted counter wheels and a reciprocable actuator for advancing the units counter wheel one-tenth of a revolution each time the actuator is reciprocated through a bi-directional operating cycle. In contrast to the prior art counters described above in which the units wheel is operated directly by the actuator, the counters of the present invention are provided with a separate, independent, counter input gear which is stepped through a 36° angle by the actuator to advance the units wheel. The actuator operated input gears have two rows of teeth, each of two actuator carried stops engaging the teeth in one of the two rows.

A number of advantages are realized from this novel actuator construction. The teeth in the two rows may be overlapped, eliminating the dead center position of the prior art counters and insuring that the units counter wheel will be advanced even though the actuator is reciprocated through only a small fraction of its full stroke. The detent pawl may be arranged to coact directly with the counter input gear, eliminating the separate detent wheel of the prior art counters and the problem of designing such wheels with equiangularly spaced teeth which would accommodate both the 27° and 9° steps of the detent wheel. And, as the counter input gear is a separate member, it may be formed of metal, thus providing better wear resistance than the nylon teeth of the prior art counters.

It will be apparent from the above discussion that another object of the present invention resides in the provision of public and protective counters which eliminate the operational problems of the prior art counters.

Yet another object of the present invention is the provision of public and protective counters which have a longer useful life than those heretofore provided.

Additional objects and further novel features of the present invention will become more fully apparent from the appended claims and as the ensuing detailed description and discussion proceeds in conjunction with the accompanying drawing, in which:

FIGURE 1 is a fragmentary front elevation of an automatic voting machine of the type in which the novel public and protective counters provided by the present invention are intended to be employed with a portion of the voting machine housing removed to show its internal components and with components unrelated to the present invention deleted for clarity;

FIGURE 2 is a vertical section through the voting machine of FIGURE 1, taken substantially along line 2—2 of the latter figure, and illustrates the motion transmitting linkage connecting the public and protective counter actuators to the voting machine's main operating lever;

FIGURE 3 is an elevation of the novel public counter provided by the present invention;

FIGURE 4 is an elevation of the public counter looking in the direction of arrows 4—4 in FIGURE 3;

FIGURE 5 is a view similar to FIGURE 3, but of the protective counter;

FIGURE 6 is a section through the counter of FIGURE 5, taken substantially along line 6—6 of the latter figure;

FIGURE 7 is an elevation of the counter input gear employed in both the public and protective counters;

FIGURE 8 is an elevation similar to FIGURE 7, but showing the opposite side of the counter input gear;

FIGURE 9 is a section through the counter input gear taken substantially along line 9—9 of FIGURE 7.

Figure 10:
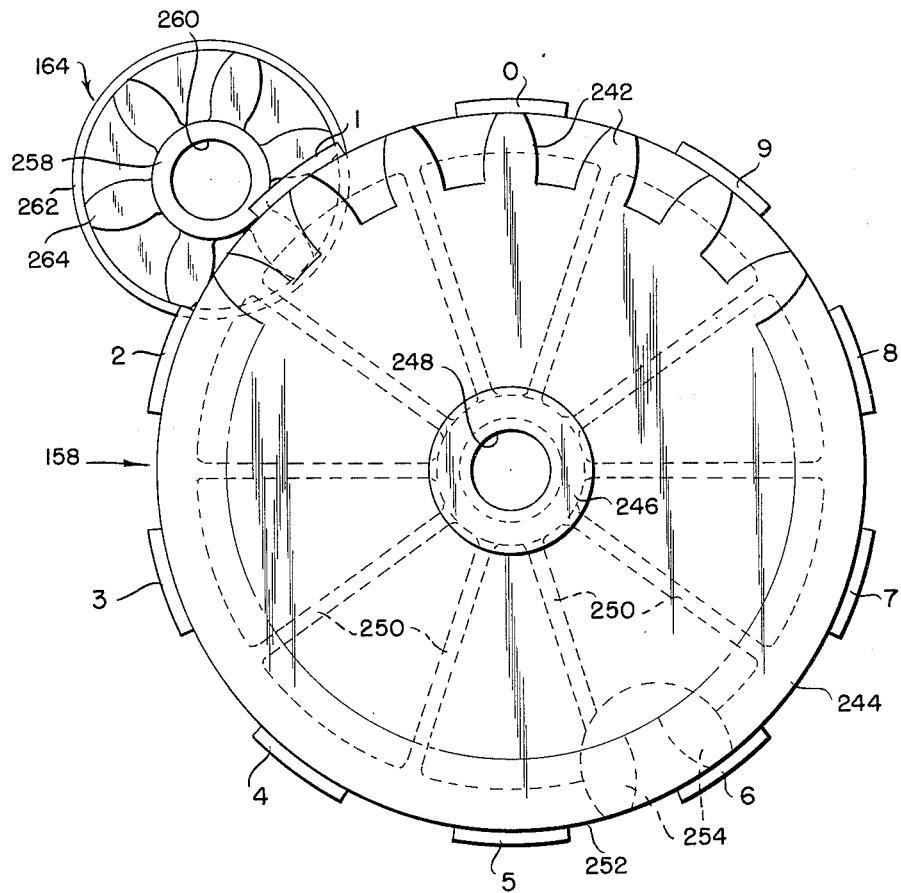
FIGURE 10 is a view showing the relation between a counter wheel and a transfer pinion.

Referring now to the drawing, FIGURE 1 illustrates a voting machine 22 of the type in which the novel public and protective counters provided by the present invention are intended to be employed. Among its major components voting machine 22 includes a curtain operating and voting machine conditioning mechanism 24 actuated by a main operating lever 26 and public and protective counters 28 and 30 connected to the curtain operating and machine conditioning mechanism by a motion transmitting linkage identified generally by reference character 32.

Curtain operating and machine conditioning mechanism 24 which, by itself, forms no part of the present invention is of the type disclosed in United States Patent No. 2,284,144 issued May 26, 1942, to A. N. Gustavson for "Voting Machine" to which reference may be had if deemed necessary. In brief, this mechanism includes a horizontally extending shaft 34 rotatably supported by the front and rear plates 36 and 38 of a framework 40 supported from the voting machine casing 42 below keyboard 44.

Fixed to shaft 34 between plates 36 and 38 is a substantially semicircular disk 46 to which a curtain mechanism input link 48 is pivotably connected by a pivot stud 50. The remainder of the curtain operating mechanism (not shown) may be substantially identical to that shown in the Gustavson patent referred to above. Disk 46 also supports a laterally offset arm 52 to which one end of an elongated link 54 comprising the input member of motion transmitting linkage 32 is pivotably connected by a pivot stud 56.

Shaft 34 and disk 46 are rotated by lever 26 which terminates at its upper end in a handle 58 and at its lower end in a pair of parallel spaced apart forks 60 disposed on opposite sides of shaft 34. The lower end of lever 26 is surrounded by a sleeve 62 rotatably fixed to shaft 34 as by a pin 64.

Lever 26 is movable from an "unvoted" position (shown in full lines and identified by reference character 26a) through a "reset" position (identified by reference character 26b) to a "voted" position (identified by reference character 26c). Its movement is limited by a pair of stops 66 and 68 mounted on shaft supporting plate 36.

To insure that lever 26 is moved fully from the "voted" position 26c to "non-voted" position 26a before it is returned to the "voted" position, a locking mechanism comprising a Y-shaped member 70 and a T-shaped member 72 connected by springs 74 and 76, a ratchet plate 78, and a gear segment 80 formed on disk 46 is employed. This mechanism, which forms no part of the present invention, is described in detail in the Gustavson patent referred to above.

As was previously indicated, one end of motion transmitting link 54 is pivotably connected to disk 46 of operating mechanism 24 through arm 52. The opposite end of link 54 is connected by a pivot stud 82 to one arm 84 of a bellcrank 86 supported by a pivot stud (not shown) on a bracket 88 which may be attached in any suitable manner to voting machine casing 42. Bellcrank 86 is biased in a clockwise direction by a spring 90 hooked over pivot stud 82 and over a stud 92 fixed to a casing mounted bracket 94.

The lower arm 96 of bellcrank 86 is connected by a pivot stud 98 to a side arm connecting link 100. The upper end of link 100 is connected by a pivot stud 104 to a bracket 106 which is fixed to a vertically extending side arm 108 intermediate its ends.

Turning now to FIGURE 2, side arm 108 is mounted for vertical reciprocating movement by a side arm roller 110 journalled on a stub shaft 112 fixed to voting machine casing 42 and by a slide bar return link (not shown) to which side arm 108 is operatively connected adjacent its upper end. Side arm 108 is connected to actuator 114 of public counter 28 by a public counter operating lever 116 and a public counter link 117. Lever 116 is pivotably mounted at one end on a stud 118 fixed to voting machine casing 42. The opposite end of lever 116 terminates in a pair of spaced apart forks 120 and 122 disposed on opposite sides of a stud 124 fixed to side arm 108.

The lower end of V-shaped public counter link 117 is pivotably connected to lever 116 adjacent pivot stud 118 by a pivot stud 128. A stud 130 fixed to the lower end of public counter actuator 114 extends through the upper end of link 117 which may be retained on stud 130 as by a cotter key (not shown).

Side arm 108 is operatively connected to the actuator 132 of protective counter 30 by a protective counter operating lever 134 and a protective counter link 136. Lever 134 is journalled on a stub shaft 138 fixed to casing 42 and terminates in a pair of forks 140 and 142 disposed on opposite sides of a pivot stud 144. Pivot stud 144 is fixed to a bracket 146 attached in any appropriate manner to side arm 108. The lower end of link 136 is fixed to lever 134 adjacent pivot stud 138 by a pivot stud 148. A stud 150, fixed to the lower end of protective counter actuator 132, extends through the upper end of link 136 which is retained on the stud as by a cotter key (not shown).

Counters 28 and 30 may be mounted in voting machine 22 in any desired manner. In the illustrated embodiment, counters 28 and 30 are fixed directly to casing 42.

Referring now to FIGURES 3 and 4, public counter 28 includes, in addition to actuator 114, an input gear 156, counter wheels 158, 160, and 162, transfer pinions 164 and 166, and a spring-biased pawl 168, all mounted in a sheet metal housing 170. As is best shown in FIGURE 3, housing 170 has a U-shaped configuration providing parallel, spaced apart side walls 172 and 174 and a transversely extending rear wall 176. Housing 170 is preferably formed from an L-shaped member 178 and a rectangular member 180 connected by spacer studs 182, 184, and 186. Spacer studs 182, 184, and 186 have reduced diameter end portions 188 which are swaged over after the counter is assembled to fix housing side walls 172 and 174 against annular shoulders 190 between the reduced diameter end portions 188 and the main body portions 192 of the spacer studs.

Input gear 156 and counter wheels 158, 160, and 162 are journalled in side-by-side relationship on a counter wheel supporting shaft 194 rotatably supported by and extending between housing side walls 172 and 174. A spring washer 195 on shaft 194 between counter input gear 156 and actuator 114 maintains counter input gear 156 and counter wheels 158, 160, and 162 in the proper assembled relationship. Counter wheels 158, 160, and 162 may be read through a slot (not shown) formed in housing wall 176.

Actuator 114 is reciprocably mounted in housing 170 on counter wheel supporting shaft 194 which extends through an elongated slot 196 (see FIGURE 4) in the main body portion 198 of the actuator and by spacer stud 182 which extends through an elongated aperture 200 formed in the actuator main body portion in axial alignment with slot 196. A reduced diameter end portion 202 of spacer stud 182 provides an annular shoulder 204 which, together with input gear 156, maintains actuator 114 in juxtaposition to housing side wall 172.

As was discussed above, actuator 114 of public counter 28 is operatively connected to a public counter link 117 (see FIGURE 2) by a stud 130 extending normally from the lower end of the actuator main body portion 198. Stud 130 has a reduced diameter end portion 206 which extends through an aperture (not shown) in the upper end of link 117 and an enlarged diameter end portion 208 providing an annular shoulder 210 which vertically aligns link 117. The upper end of the flat, elongated, planer, main body portion 198 of actuator 114 terminates in a horizontally extending integral portion 212 from which an integral, reduced width, counter input gear engaging stop 214 depends. A second counter input gear engaging stop in the form of a cylindrical pin 216 is fastened to the main body portion 198 of actuator 114 at substantially its midpoint and on the opposite side of counter input gear 156 from stop 214.

Referring now to FIGURES 7–9, counter input gear 156, which is preferably fabricated from a wear resistant metal, has two parallel rows of gear teeth 218 and 220 separated by a thin annular rib 222 and a hub 226 in which a bore 228 is formed. As is best shown in FIGURES 7 and 8, the teeth 230 in row 218 and the teeth 232 in row 220 are disposed in overlapping relationship and, as shown in FIGURE 5, the actuator carried stops 214 and 216 are so dimensioned that, when actuator 114 is moved upwardly (the upstroke), stop 216 engages the trailing edge 236 of a tooth 230, stepping input gear 156 in the direction indicated by the arrow in FIGURE 8. When actuator 114 is moved downwardly (the downstroke), stop 214 engages the trailing edge 234 of a tooth 232, again stepping counter input gear 156 in the direction indicated by the arrow in FIGURE 8.

As is shown in FIGURES 7 and 8, there are ten teeth 230 in row 218 and ten teeth 232 in row 220. The crest of these equiangularly spaced teeth are, therefore, 36° or 1/10 of one revolution apart. As is shown in FIGURE 7, the teeth in the two rows 218 and 220 are so overlapped that the crest of the adjacent teeth in the two rows are spaced 18° apart. It will be apparent, therefore, that counter input gear 156 will be rotated 36° or 1/10 of one revolution each time actuator 114 is operated through its bidirectional cycle, 18° by the actuator upstroke and 18° by the actuator downstroke.

Counter input gear 156 is rotatably fixed to the shaft 194 on which it is journalled in any convenient manner and is rotatably fixed to the units counter wheel 158 by pins 238 and 240 which extend normally from counter input gear 156 between spur gear teeth 242 (see FIGURE 10) formed on the adjacent side surface of the counter wheel.

Referring now specifically to FIGURE 10, counter wheels 158, 160, and 162, which are identical, are preferably formed from a strong light weight plastic such as nylon. Each of the counter wheels has a rim 244 and a hub 246 with a bore 248 formed therein connected by radially extending ribs 250. The digits "0" through "9" are formed at equal 36° intervals on the peripheral surface 252 of counter wheel rim 244. The spur gear teeth 242, referred to above, are formed at 18° intervals on one side of the counter wheel rim 244, there being a total of 20 such teeth. On the oposite side of the counter wheel rim 244, between the digits "5" and "6," two spur gear teeth 254 having the same configuration as spur gear teeth 242 are formed.

The spur gear teeth 254 on one counter wheel and the spur gear teeth 242 on the counter wheel of the higher order cooperate with a transfer pinion (164 or 166) to advance the higher order counter wheel 1/10 of one revolution (i.e., one digit) for each revolution of the lower order counter wheel. As is shown in FIGURE 3, transfer pinions 164 and 166 are rotatably mounted on a shaft 256 supported between housing side walls 172 and 174 parallel to counter wheel supporting shaft 194. Transfer pinion 164 (and transfer pinion 166 is identical) includes a hub portion 258 with a bore 260 formed therein, and an annular rib 262 with six equiangularly spaced spur gear teeth 264 formed on one side of the rib and six similar teeth 226 on the other. The spur gear teeth 266 mesh with the spur gear teeth 242 of the higher order of the two counters between which the transfer pinion is located. Alternate ones of the transfer pinion gear teeth 264, which are substantially wider than the intervening teeth 264, are engaged by the spur gear teeth 254 on the lower order of the two pinions between which the transfer pinion is disposed once per revolution of the lower order wheel to rotate the transfer pinion. The intervening narrower spur gear teeth 264 permit the transfer pinion to rotate relative to the lower order counter wheel without interference.

In its bi-directional operating cycle consisting of one upstroke and one downstroke, there will be two periods when both of the stops 214 and 216 carried by actuator 114 will be disengaged from the teeth 230 and 232 of counter input gear 156. Pawl 168 is employed to positively position the counter input gear during these portions of the operating cycle.

As is best shown in FIGURES 3 and 4, pawl 168 is an elongated bar-like member pivotably mounted adjacent its lower end on spacer stud 184. A V-shaped tooth 268, formed adjacent the upper end of pawl 168, is configured to engage the equiangularly spaced teeth 230 of counter input gear 156 against which it is biased by a torsion spring 270 journalled on spacer stud 184 adjacent pawl 168. One end 272 of torsion spring 270 is hooked around the edge of housing side wall 172. The other torsion spring end 274 is hooked around pawl 168 adjacent its upper end.

The distance between the actuator carriage stops 214 and 216 is substantially greater than the maximum diameter of counter input gear 156, permitting both of the stops to be moved out of engagement with counter input gear teeth 230 and 232 as observed above. This permits counter wheel supporting shaft 194 to be directly rotated in the reverse direction from its normal counter wheel advancing rotation to reset the counter wheels after an election. A knurled knob 275 is fastened to shaft 194 adjacent the outer side of housing side wall 172 to facilitate counter resetting rotation.

A horizontally extending stud 276, fixed to pawl 168 adjacent its upper end and extending through an arcuate slot 278 in housing side wall 172, permits pawl 168 to be rocked out of engagement with the teeth of counter input gear 156 when public counter 28 is reset.

As is shown in FIGURE 3, a reduced diameter portion 279 of stud 276 forms shoulders 280 and 282 which cooperate with side wall 172 to guide pawl 168. An enlarged circular end portion 284 of slot 278 is adapted to receive the enlarged diameter main body portion 286 of stud 276 and hold pawl 168 out of engagement with counter input gear teeth 230 while the counter is reset.

Referring now to FIGURES 5 and 6, protective counter 30 is, in most respects, identical to public counter 28 and like reference characters have, therefore, been employed to identify those elements common to both counters. One important difference between protective counter 30 and public counter 28 is that, in the former, a counter reset preventing stop 288 is fixed to actuator 132 between stops 214 and 216 on the same side of counter wheel supporting shaft 194 as stop 216. The distance between the actuator carried gear engaging stops 214 and 288 is substantially less than the diameter of counter input gear 156, precluding direct rotation of counter wheel mounting shaft 194. Since actuator 132 is constructed to step counter input gear 156 only in a counter wheel advancing direction, resetting of the protective counter 30 is therefore precluded.

There are further minor distinctions between protective counter 30 and public counter 28. Since protective counter 30 is not resettable, resetting knob 275 is deleted. Furhter, protective counter 30 is provided with two additional counter wheels 289 and 290 and two additional transfer pinions 292 and 294 to increase its capacity since it is not reset after each election. As a result of employing the additional counter wheels, there is a substantially larger gap between housing members 178 and 180 than in public counter 28.

With reference first to FIGURE 1, the operation of the novel public and protective counter mechanism provided by the present invention is as follows: when the voter enters the voting booth, he moves main operating lever 26 from the "non-vote" position 26a to the "vote" position c. This accomplishes three functions. First, it closes the curtain (not shown) of the voting booth to conceal the voter. Second, it unlocks the voting machine, readying it for voting. Third, it advances public counter 28 and protective counter 30 ½ digit. After operating lever 26 and unlocking voting machine 22, the voter may cast his ballot by depressing the appropriate party lever and/or selected individual candidate and question levers.

After he has finished voting, the voter moves main operating lever 26 from the "vote" position 26c through "reset" position 26b to "non-vote" position 26a, during which the voting and party levers are returned and register operating linkages are actuated to register votes for the candidates selected by the voter. As operating lever 26 reaches the "non-vote" position, voting machine 20 is locked, the curtain of the voting booth is opened, and the counter input gears 156 of public counter 28 and protective counter 30 are stepped approximately 18° for full digit count.

Turning now to FIGURES 1 and 2, as main operating lever 26 is rotated clockwise from "non-vote" position 26a to "vote" position 26c, shaft 34 and disk 46 are rotated clockwise by lever 26. The clockwise movement of disk 46, transmitted through pivot stud 56, pulls input link 54 of motion transmitting linkage 32 to the right, rotating bellcrank 86 in a lockwise direction.

As bellcrank 86 rotates clockwise, it moves side arm connecting link 100 and side arm 108 upwardly, rotating public counter lever 116 and protective counter operating lever 134 counterclockwise about stub shafts 118 and 138. As public counter operating lever 116 rotates, it moves public counter link 117 and public counter actuator 114 upwardly, engaging the actuator carried stop 216 with a tooth 230 on counter input gear 156 and stepping the counter input gear approximately 18°. This rotates the units counter wheel 158 through the same angular increment; i.e., approximately one-half the distance toward the next higher digit.

At the same time that public counter 28 is being stepped, clockwise movement of protective counter operating lever 134 moves protective counter link 136 and protective counter actuator 132 upwardly, advancing the units counter wheel 158 of protective counter 30 approximately one-half digit.

Motion transmitting linkage 32 and counters 28 and 30 will remain in this configuration until the voter returns main operating lever 26 to "non-vote" position 26a.

Returning now to FIGURE 1, when main operating lever 26 is rotated counterclockwise from the "vote" to the "non-vote" position, shaft 34 and disk 46 pivot in the same direction, moving motion transmitting linkage input link 54 to the left, rotating bellcrank 86 counterclockwise, and moving side arm connecting link 100 and side arm 108 downwardly. Downward movement of side arm 108 rotates public counter operating lever 116 and protective counter operating lever 134 clockwise (downwardly) about stub shafts 118 and 138. As operating lever 116 rotates, it pulls public counter link 117 and public actuator 114 downwardly, engaging actuator carried stop 214 with a tooth 232 of counter input gear 156 and rotating the gear through another 18° increment, advancing the units counter wheel 158 through the same increment for full digit to appear. If this advances the units counter wheel 158 from "9" to "0," the transfer teeth 254 on units counter wheel 158 engage a tooth 264 on transfer pinion 164, rotating the transfer pinion. As the transfer pinion 164 rotates, spur gear teeth 266 engage the spur gear teeth 242 on the tens counter wheel 160, advancing wheel 160 one-tenth of a revolution and causing the next higher digit to appear. In a similar manner, the hundreds counter wheel 162 is advanced one-tenth of a revolution to cause the next higher digit to appear every ten revolutions of units counter wheel 158. A detent (not shown) stamped in house side wall 174 prevents counter wheel 162 from rotating past digit "0" by engaging one of the gear teeth 254 on the counter wheel.

Simultaneously, the clockwise rotation of protective counter operating lever 134 moves protective counter link 136 and protective counter actuator 132 downwardly, completing the advancement of the counter wheels in the protective counter in the manner described in conjunction with public counter 28.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A counting device, comprising:
    (a) a housing having a pair of spaced, substantially parallel side walls;
    (b) a shaft extending between and rotatably supported by said side walls;
    (c) a plurality of counter wheels journalled on said shaft;
    (d) transfer pinions between and operatively engaged with adjacent counter wheels;
    (e) an input gear having two rows of teeth fixed on said shaft adjacent the units counter wheel and rotatably fixed to said counter wheel; and
    (f) an actuator mounted in said housing for reciprocable movement in a path normal to the axis of said counter wheel shaft, said actuator having a first stop movable into gear advancing engagement with a tooth in said rows by operation of said actuator in one direction and a second stop movable into gear advancing engagement with a tooth in the other of said rows by operation of said actuator in the opposite direction.

2. The counting device as defined in claim 1, wherein the teeth in the two rows are disposed in side-by-side staggered relationship.

3. The counting device as defined in claim 1, including:
    (a) a pawl in said housing mounted for pivotal movement about an axis parallel to the longitudinal axis of the counter wheel supporting shaft and having a tooth adapted to engage the teeth in one of said rows; and
    (b) a torsion spring biasing said pawl tooth against said input gear.

4. The counting device as defined in claim 1, wherein:
    (a) said counter wheels are fabricated from a non-metallic material; and
    (b) said input gear is fabricated from a metal having substantially greater wear resistance than said non-metallic material.

5. The counting device as defined in claim 1, including a knob fastened to said shaft for resetting said counter wheels.

6. The counting device as defined in claim 1:
    (a) including a shaft in said housing substantially parallel to said counter wheel supporting shaft; and
    (b) wherein said actuator has a pair of spaced elongated slots formed therein, said last-mentioned shaft and said counter wheel supporting shaft each extending through one of said slots to reciprocably support said actuator.

7. The counting device as defined in claim 1, wherein:
    (a) one of said stops is fixed to said actuator intermediate its ends; and
    (b) said actuator has an integral, hook-like end portion providing the other of said stops.

8. A counting device, comprising:
    (a) a housing;
    (b) a shaft rotatably supported in said housing;
    (c) a plurality of counter wheels journalled on said shaft;

(d) motion transmitting means operatively connected between adjacent counter wheels;

(e) input gear means having two rows of teeth on said shaft adjacent the units counter wheel and rotatably fixed to said counter wheel; and (f) an actuator mounted in said housing for reciprocable movement in a path normal to the axis of said counter wheel shaft, said actuator having a first stop movable into gear advancing engagement with a tooth in said rows by operation of said actuator in one direction and a second stop movable into gear advancing engagement with a tooth in the other of said rows by operation of said actuator in the opposite direction.

9. In a counting device:

(a) a counter wheel;

(b) an input gear operatively connected to said counter wheel;

(c) an actuator movable in opposite directions to alternately engage first and second stops carried by said actuator with said input gear and step said counter wheel through predetermined angular increments;

(d) the distance between said stops being substantially less than the diameter of said input gear to thereby limit said input gear to unidirectional rotation and prevent resetting of said counter wheel;

(e) said input gear having two rows of teeth and one of said stops being operatively associated with each of said rows; and (f) means constraining said actuator to movement in a rectilinear path.

10. In a counting device:

(a) a counter wheel;

(b) an input gear operatively connected to said counter wheel;

(c) an actuator movable in opposite directions to alternately engage first and second stops carried by said actuator with said input gear and step said counter wheel through predetermined angular increments;

(d) the distance between said stops being greater than the maximum diameter of said input gear to permit said gear to be rotated in a counter wheel resetting direction;

(e) said input gear having two rows of teeth and one of said stops being operatively associated with each of said rows; and (f) means constraining said actuator to movement in a rectilinear path.

References Cited by the Examiner
UNITED STATES PATENTS

| | | | |
|---|---|---|---|
| 825,208 | 7/1906 | Hanly | 58—27 |
| 1,875,060 | 8/1932 | Long | 235—91 |
| 2,688,904 | 9/1954 | Richter | 58—28 |
| 2,800,763 | 7/1957 | Ensign et al. | 58—28 |
| 3,141,611 | 7/1964 | Ambrozaitis | 235—91 |

LEO SMILOW, *Primary Examiner.*

LEYLAND M. MARTIN, *Examiner.*